United States Patent
Li et al.

(10) Patent No.: US 9,977,197 B1
(45) Date of Patent: May 22, 2018

(54) FLOATING ADJUSTABLE SEALING MECHANISM AND CONNECTOR USING SAME

(71) Applicant: AVIC JONHON OPTRONIC TECHNOLOGY CO., LTD, Henan (CN)

(72) Inventors: Weike Li, Henan (CN); Geng Xu, Henan (CN); Wenhao Yao, Henan (CN); Yunzhao Han, Henan (CN); Kai Hu, Henan (CN); Xutao Wang, Henan (CN); Tao Liu, Henan (CN)

(73) Assignee: AVIC JOHNSON OPTRONIC TECHNOLOGY CO., LTD, Henan (CN)

( * ) Notice: Subject to any disclaimer, the term of this patent is extended or adjusted under 35 U.S.C. 154(b) by 0 days. days.

(21) Appl. No.: 15/575,818

(22) PCT Filed: Jul. 17, 2015

(86) PCT No.: PCT/CN2015/084382
§ 371 (c)(1),
(2) Date: Nov. 21, 2017

(87) PCT Pub. No.: WO2016/183924
PCT Pub. Date: Nov. 24, 2016

(30) Foreign Application Priority Data

May 21, 2015 (CN) .......................... 2015 1 0261791

(51) Int. Cl.
*G02B 6/36* (2006.01)
*G02B 6/38* (2006.01)
*H01R 13/631* (2006.01)

(52) U.S. Cl.
CPC ......... *G02B 6/3875* (2013.01); *G02B 6/3861* (2013.01); *G02B 6/3869* (2013.01); *G02B 6/3893* (2013.01); *H01R 13/6315* (2013.01)

(58) Field of Classification Search
CPC .. G02B 6/3887; G02B 6/3893; G02B 6/3869; G02B 6/3821; G02B 6/3825; G02B 6/36
See application file for complete search history.

(56) References Cited

U.S. PATENT DOCUMENTS

| | | | | |
|---|---|---|---|---|
| 8,764,312 | B2* | 7/2014 | Wang | G02B 6/4292 385/73 |
| 8,770,855 | B2* | 7/2014 | Miller | G02B 6/4293 385/53 |

(Continued)

FOREIGN PATENT DOCUMENTS

| | | |
|---|---|---|
| CN | 201111313 | 9/2008 |
| CN | 201408279 | 2/2010 |

(Continued)

OTHER PUBLICATIONS

"International Search Report (Form PCT/ISA/210)", dated Feb. 18, 2016, with English translation thereof, pp. 1-6.

*Primary Examiner* — Jennifer Doan
(74) *Attorney, Agent, or Firm* — JCIPRNET

(57) ABSTRACT

A floating adjustable sealing mechanism and a connector using same. The floating adjustable sealing mechanism comprises an adhesive sleeve, and a support of which a front end is a plugging end. An internal hole of the support is provided with a guide mounting section having a guiding direction extending along a front-rear direction. The adhesive sleeve is mounted in the internal hole of the support by means of a guide mating section which is disposed thereon and in a sliding and sealing fit with the guide mounting section. The length of the guide mounting section is greater than the length of the guide mating section. The adhesive sleeve is mounted in the internal hole of the support by means of the sliding and sealing fit between the guide mating section disposed on the adhesive sleeve and the guide mounting section on the support; and in this way, the (Continued)

adhesive sleeve can move back and forth in the internal hole of the support, and the relationship of sealing fit between the adhesive sleeve and the internal hole of the support can be constantly ensured during the back-and-forth movement.

16 Claims, 1 Drawing Sheet

(56) References Cited

U.S. PATENT DOCUMENTS

| | | | |
|---|---|---|---|
| 8,858,089 B2 * | 10/2014 | Bradley | G02B 6/3885 385/60 |
| 2011/0281450 A1 | 11/2011 | Loke et al. | |

FOREIGN PATENT DOCUMENTS

| | | |
|---|---|---|
| CN | 101707297 | 5/2010 |
| CN | 201498748 | 6/2010 |
| CN | 201852959 | 6/2011 |
| CN | 201852961 | 6/2011 |
| CN | 202817345 | 3/2013 |
| CN | 103050809 | 4/2013 |
| CN | 203133326 | 8/2013 |
| CN | 203351818 | 12/2013 |
| CN | 203983619 | 12/2014 |
| CN | 104297861 | 1/2015 |
| CN | 104317007 | 1/2015 |
| CN | 104503034 | 4/2015 |
| CN | 204331094 | 5/2015 |
| CN | 105006692 | 10/2015 |
| EP | 0798580 | 10/1997 |
| JP | H1090558 | 4/1998 |

\* cited by examiner

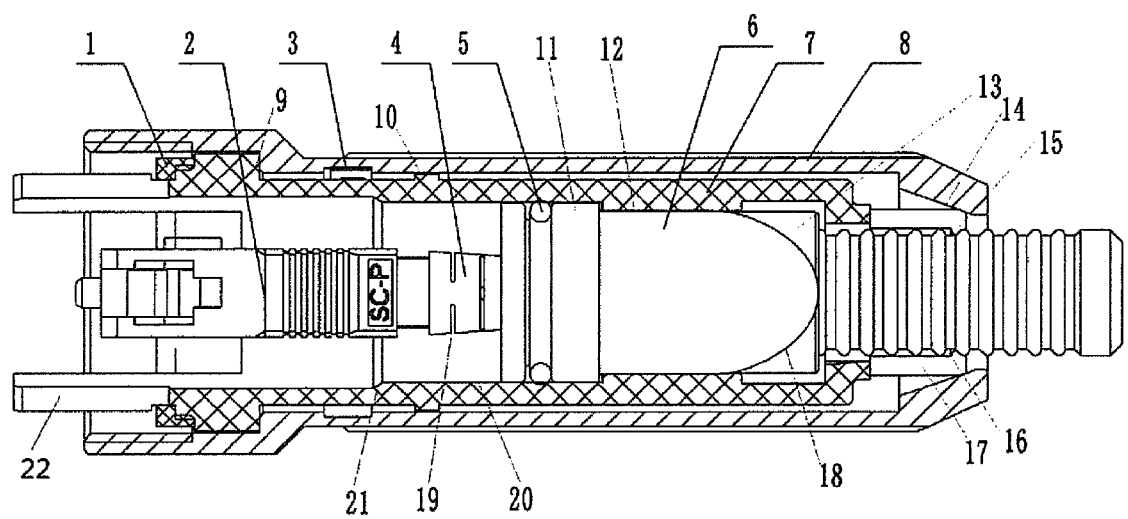

FLOATING ADJUSTABLE SEALING MECHANISM AND CONNECTOR USING SAME

CROSS-REFERENCE TO RELATED APPLICATION

This application is a 371 application of the International PCT application serial no. PCT/CN2015/084382, filed on Jul. 17, 2015, which claims the priority benefit of China application no. 201510261791.8, filed on May 21, 2015. The entirety of each of the above-mentioned patent applications is hereby incorporated by reference herein and made a part of this specification.

BACKGROUND OF THE INVENTION

1. Field of the Invention

The present invention relates to a floating adjustable sealing mechanism and a connector using the same in the field of signal transmission.

2. Description of Related Art

An existing optical cable connector for outdoor use, such as an "optical cable connector" disclosed in Chinese patent CN201408279Y, includes an optical fiber plug, of which a front end is an inserting terminal, and a support sleeved on a periphery of the optical fiber plug. An outer shell is sleeved on a periphery of the support. The outer shell is rotatable relative to the support. The support is provided with a shell limiting boss that defines a forward movement limit of the outer shell. A tail end of the support is provided with a contraction claw. An outer end of the outer shell is provided with an internal conical surface fitting the contraction claw. The optical fiber plug is connected to an adhesive sleeve by means of an optical cable. The adhesive sleeve is fixed in an internal hole of the support. In use, an operator first inserts the optical fiber plug into a corresponding optical fiber socket, then sleeves the support from the rear to the front onto the periphery of the optical fiber plug and fixes the adhesive sleeve to the support, and finally sleeves the outer shell from the rear to the front onto the support, so that an internal thread on a front end of the outer shell matches a corresponding external thread. In a process of forward movement of the outer shell, the internal conical surface presses the contraction claw, so that the contraction claw clings to the optical cable to implement tensile performance. The adhesive sleeve is fixedly connected to the support to seal the optical fiber plug, so as to prevent corresponding impurities such as water and dust from entering the optical fiber plug in a rear-front direction. The problem with the existing optical cable connector is that: the adhesive sleeve is fixed at a fixed position of the support; however, in actual use, because the axial sizes of optical fiber plugs purchased from different places are inconsistent, the versatility of the support is low, and the requirement for mounting precision is relatively high; the outer shell may be detached from the rear end of the support; during mounting, the support needs to be firstly clamped on the socket, and then the outer shell is mounted. Therefore, two steps are needed before the mounting is completed and the mounting efficiency is low. In addition, openings of most sockets are downward, so that the support may easily fall off, thus making the mounting difficult. In a process of mounting the optical fiber plug into the socket, due to a limited space of a connection position, an operator usually holds the adhesive sleeve to insert the optical fiber plug into the socket. However, the optical cable between the optical fiber plug and the adhesive sleeve is relatively soft, leading to great inconvenience of the connection process.

SUMMARY OF THE INVENTION

The present invention is directed to provide a connector, to resolve the problem in the prior art that the versatility of an optical cable connector is poor due to fixed positions of an adhesive sleeve and a support. The present invention is also directed to provide a floating adjustable sealing mechanism used in the connector.

To resolve the foregoing problem, technical solutions of the connector in the present invention are:

A connector, where the connector is an optical cable connector or an electrical connector. The connector includes a floating adjustable sealing mechanism and a plug. The floating adjustable sealing mechanism includes an adhesive sleeve, and a support of which a front end is an inserting terminal. An internal hole of the support is provided with a guide mounting section having a guiding direction extending along a front-rear direction. The adhesive sleeve is mounted in the internal hole of the support by means of a guide mating section which is disposed thereon and in a sliding and sealing fit with the guide mounting section, and the length of the guide mounting section is greater than that of the guide mating section. The adhesive sleeve is provided with at least two rotation stopping key slots on a rear side of the guide mating section. An internal hole wall of the support is provided with a rotation stopping key configured to be inserted into a corresponding rotation stopping key slot along the front-rear direction. A rear end of each rotation stopping key slot is provided with a guiding notch of which a caliber gradually decreases from the rear to the front. Slot walls on two sides of the guiding notch are linear wall surfaces or arc-shaped wall surfaces, and rear ends of the slot walls at adjacent sides of two adjacent guiding notches are connected to each other.

The adhesive sleeve is connected to the plug by means of a supporting connection sleeve, and an outer peripheral surface of the supporting connection sleeve is provided with an elongated groove that extends along a circumferential direction of the supporting connection sleeve.

The front end of the support is provided with an anti-rotation inserting structure that is inserted on a corresponding socket for stopping rotation.

An outer shell is rotatably sleeved on the support. The support is provided with a front limiting protrusion that defines a forward movement limit of the outer shell, and the support is provided with a rear limiting protrusion on a rear side of the front limiting protrusion. The outer shell is provided with a shell limiting portion that is disposed between the front and rear limiting protrusions and configured to collaborate with the rear limiting protrusion in a stopping manner to define a backward movement limit of the shell relative to the support.

Technical solutions of the floating adjustable sealing mechanism in the present invention are:

A floating adjustable sealing mechanism of a connector, where the floating adjustable sealing mechanism includes an adhesive sleeve, and a support of which a front end is an inserting terminal. An internal hole of the support is provided with a guide mounting section having a guiding direction extending along a front-rear direction. The adhesive sleeve is mounted in the internal hole of the support by means of a guide mating section which is disposed thereon and in a sliding and sealing fit with the guide mounting section, and the length of the guide mounting section is greater than that of the guide mating section.

The adhesive sleeve is provided with at least two rotation stopping key slots on a rear side of the guide mating section. An internal hole wall of the support is provided with a rotation stopping key configured to be inserted into a corresponding rotation stopping key slot along the front-rear direction. A rear end of each rotation stopping key slot is provided with a guiding notch of which a caliber gradually decreases from the rear to the front. Slot walls on two sides of the guiding notch are linear wall surfaces or arc-shaped wall surfaces, and rear ends of slot walls at adjacent sides of two adjacent guiding notches are connected to each other.

A front end of the adhesive sleeve is provided with a supporting connection sleeve configured to connect a plug, and an outer peripheral surface of the supporting connection sleeve is provided with an elongated groove that extends along a circumferential direction of the supporting connection sleeve.

The front end of the support is provided with an anti-rotation inserting structure that is inserted on a corresponding socket for stopping rotation.

An outer shell is rotatably sleeved on the support. The support is provided with a front limiting protrusion that defines a forward movement limit of the outer shell; the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

The beneficial effects of the present invention are: according to the present invention, the adhesive sleeve is mounted in the internal hole of the support by means of the sliding and sealing fit between the guide mating section disposed on the adhesive sleeve and the guide mounting section on the support, and in this way the adhesive sleeve can move back and forth in the internal hole of the support and also the relationship of sealing fit between the adhesive sleeve and the internal hole of the support can be constantly ensured during the back-and-forth movement. Adaptive adjustment can be realized via positional movement of the adhesive sleeve when in use, and thus the versatility of the connector is improved.

DESCRIPTION OF THE DRAWING

FIG. 1 is a schematic structural diagram of an embodiment of a connector according to the present invention.

DESCRIPTION OF THE EMBODIMENTS

Embodiment 1 of a connector is as shown in FIG. 1: the connector in the present embodiment is an optical cable connector, including a plug 2 of which a front end is an inserting terminal and a floating adjustable sealing mechanism. The plug is an optical fiber plug. The floating adjustable sealing mechanism includes an adhesive sleeve 6 that is disposed on a rear side of the plug 2 by using a supporting connection sleeve 4. A support 7 of which a front end is an inserting terminal is sleeved on a periphery of the plug. The front end of the support is provided with an anti-rotation inserting structure that is inserted on a corresponding socket for stopping rotation. The anti-rotation inserting structure in the present embodiment is two anti-rotation flat blocks 22 spaced with an interval in a circumferential direction. An outer shell 8 is rotatably sleeved on a periphery of the support 7. A front end of the outer shell 8 is provided with an internal thread configured to connect an external thread on the socket. The support is provided with a front limiting protrusion 9 that defines a forward movement limit of the outer shell. The support 7 is provided with a rear limiting protrusion 10 on a rear side of the front limiting protrusion 9. The outer shell is provided with a shell limiting portion that is disposed between the front and rear limiting protrusions and configured to collaborate with the rear limiting protrusion in a stopping manner to define a backward movement limit of the shell relative to the support. In the present embodiment, the front and rear limiting protrusions are both around-platform structures, the shell limiting portion is formed by a clamping spring 3 in a mounting annular groove disposed on the outer shell. An elongated groove 19 that extends along a circumferential direction of the supporting connection sleeve is disposed on an outer peripheral surface of the supporting connection sleeve. An internal hole of the support is provided with a guide mounting section 20 having a guiding direction extending along a front-rear direction. The adhesive sleeve 6 is mounted in the internal hole of the support by means of a guide mating section 11 which is disposed thereon and in a sliding and sealing fit with the guide mounting section 20. The guide mating section 11 is in a sealing fit with the guide mounting section 20 by means of a seal ring 5 disposed on the guide mating section 11. The length of the guide mounting section 20 is greater than that of the guide mating section 11. In the FIGURE, the guide mating section 11 has moved to the position of a rear end of the guide mounting section. A front end of the guide mounting section 20 extends till the position of a step surface 21. The adhesive sleeve is provided with two rotation stopping key slots on a rear side of the guide mating section. An internal hole wall of the support is provided with a rotation stopping key 12 configured to be inserted into a corresponding rotation stopping key slot along a front-rear direction. A rear end of each rotation stopping key slot is provided with a guiding notch 13 of which a caliber gradually decreases from the rear to the front. Slot walls 18 on two sides of the guiding notch 13 are slot walls in a shape of a circular arc; rear ends of slot walls on adjacent sides of two adjacent guiding notches are connected to each other. A rear end of the support is provided with a locking claw 17 having an elastic hook 15. A rear end of the outer shell is provided with an internal conical surface 14 configured to press the elastic hook of the locking claw for radial contraction when the outer shell moves forwards relative to the support. The adhesive sleeve is provided with a sawtooth groove 16 that conforms with the elastic hook. The elastic hook of the locking claw may be securely locked in the sawtooth groove. Item 1 in the FIGURE represents a seal gasket.

In actual use, because the supporting connection sleeve has a supporting strength, an operator can directly hold the adhesive sleeve and insert the plug into the corresponding socket, thereby facilitating a mounting operation in a dense and messy wiring environment. The elongated groove on the supporting connection sleeve enables the supporting connection sleeve to have a bending deformation in addition to the supporting strength, which is more beneficial to facilitate field mounting. Certainly, the elongated groove also enables the adhesive sleeve to have axial movement relative to the plug, so as to facilitate accurate locking of the locking claw into the sawtooth groove. After the plug is inserted into the socket, the support and the outer shell that are assembled together are sleeved from the rear to the front onto the periphery of the plug. A fit between the rotation stopping key and the rotation stopping slot can prevent rotation of an optical cable relative to the support. Because the position at which the rotation stopping key conforms with the rotation stopping key slot is relatively deep (located on a right end of the internal hole of the support), the rotation stopping key can be accurately inserted into the rotation stopping key slot by disposing the guiding notch. If the rotation stopping key is not aligned with the rotation stopping key slot, the rotation stopping key is guided into the corresponding rotation stopping key slot along the guiding notch. Moreover, the guiding notch can perform blind-spot-less guiding on the rotation stopping key by connecting rear ends of slot walls at adjacent sides of two adjacent guiding notches to each other. Because the axial lengths of plugs purchased from various manufacturers are all inconsistent, the support can be adapted to plugs with different lengths by means of sealing and guide sliding of the guide mating section in the guide mounting section. When the lengths of modules into which the plug is plugged are inconsistent, an optical fiber connector using the structure is also applicable. Subsequently, the outer shell is rotated to be in a thread connection with the socket. In a process of forward movement of the outer shell relative to the support, the internal conical surface on the rear end of the outer shell presses the elastic hook of the locking claw, so that the elastic hook radially contracts to be clamped in the sawtooth groove, thereby implementing stable tensile performance. The outer shell is assembled with the support in advance to form an integral component. The outer shell does not detach from the rear end of the support, which facilitates mounting.

In other embodiments of the present connector, the sealing fit between the guide mating section and the guide mounting section may, alternatively, not be implemented by means of a seal ring disposed on the guide mating section. For example, a plurality of seal rings is spaced along a front-rear direction on the guide mounting section, and the distance between two adjacent seal rings is less than the length of the guide mating section. In this way, regardless of the position to which the guide mating section moves, there is a seal ring implementing a sealing between the guide mounting section and the guide mating section. Rear ends of walls at adjacent sides of adjacent guiding notches may, alternatively, not be connected. Slot walls on two sides of the guiding notch may, alternatively, be slot walls in a linear shape. Certainly, the guiding notch may, alternatively, not be disposed. The front and rear limiting protrusions may, alternatively, not be around-platform structures, and may be, for example, dotted protrusions. The clamp spring may, alternatively, be replaced with a shell limiting portion in another structural form, such as a screw that is screwed on the outer shell and extends along a radial direction to a position between the front and rear limiting protrusions. In this case, the screw forms the shell limiting portion that collaborates with the rear limiting protrusion in a stopping manner to define a backward movement limit of the outer shell. There may alternatively be one, three, four, or another number of rotation stopping key slots. The anti-rotation flat block may alternatively be replaced with another anti-rotation inserting structure such as an anti-rotation key or an anti-rotation key slot.

Embodiment 2 of the connector: Embodiment 2 differs from Embodiment 1 in that, the present connector is an electrical connector, and the plug is an electrical plug.

Embodiment 3 of the connector: Embodiment 3 differs from Embodiment 1 in that, the present connector is a signal connector, and the plug is a signal plug.

The embodiment of the floating adjustable sealing mechanism is shown in FIG. 1: the specific structure of the floating adjustable sealing mechanism is the same as that of the floating adjustable sealing mechanism in the foregoing embodiments of the connector, and details are not described herein again.

What is claimed is:

1. A connector, being an optical cable connector or an electrical connector, and the connector comprising a floating adjustable sealing mechanism and a plug, wherein the floating adjustable sealing mechanism comprises an adhesive sleeve and a support of which a front end is an inserting terminal, an internal hole of the support is provided with a guide mounting section having a guiding direction extending along a front-rear direction, the adhesive sleeve is mounted in the internal hole of the support by means of a guide mating section which is disposed thereon and in a sliding and sealing fit with the guide mounting section, and a length of the guide mounting section is greater than a length of the guide mating section.

2. The connector according to claim 1, wherein the adhesive sleeve is provided with at least two rotation stopping key slots on a rear side of the guide mating section, an internal hole wall of the support is provided with a rotation stopping key configured to be inserted into a corresponding rotation stopping key slot along a front-rear direction, a rear end of each rotation stopping key slot is provided with a guiding notch of which a caliber gradually decreases from the rear to the front, slot walls on two sides of the guiding notch are linear wall surfaces or arc-shaped wall surfaces, and rear ends of slot walls at adjacent sides of two adjacent guiding notches are connected to each other.

3. The connector according to claim 1, wherein the adhesive sleeve is connected to the plug by means of a supporting connection sleeve, and an outer peripheral surface of the supporting connection sleeve is provided with an elongated groove that extends along a circumferential direction of the supporting connection sleeve.

4. The connector according to claim 1, wherein the front end of the support is provided with an anti-rotation inserting structure that is inserted on a corresponding socket and that is configured to stop rotation.

5. The connector according to claim 1, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

6. A floating adjustable sealing mechanism of a connector, wherein the floating adjustable sealing mechanism comprises an adhesive sleeve and a support of which a front end is an inserting terminal, an internal hole of the support is provided with a guide mounting section having a guiding direction extending along a front-rear direction, the adhesive sleeve is mounted in the internal hole of the support by means of a guide mating section which is disposed thereon and in a sliding and sealing fit with the guide mounting section, and a length of the guide mounting section is greater than a length of the guide mating section.

7. The floating adjustable sealing mechanism according to claim 6, wherein the adhesive sleeve is provided with at least two rotation stopping key slots on a rear side of the guide mating section, an internal hole wall of the support is provided with a rotation stopping key configured to be inserted into a corresponding rotation stopping key slot along a front-rear direction, a rear end of each rotation stopping key slot is provided with a guiding notch of which a caliber gradually decreases from the rear to the front; slot walls on two sides of the guiding notch are linear wall surfaces or arc-shaped wall surfaces, and rear ends of slot walls at adjacent sides of two adjacent guiding notches are connected to each other.

8. The floating adjustable sealing mechanism according to claim 6, wherein a front end of the adhesive sleeve is provided with a supporting connection sleeve configured to connect a plug, and an outer peripheral surface of the supporting connection sleeve is provided with an elongated groove that extends along a circumferential direction of the supporting connection sleeve.

9. The floating adjustable sealing mechanism according to claim 6, wherein the front end of the support is provided with an anti-rotation inserting structure that is inserted on a corresponding socket and that is configured to stop rotation.

10. The floating adjustable sealing mechanism according to claim 6, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

11. The connector according to claim 2, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

12. The connector according to claim 3, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

13. The connector according to claim 4, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

14. The floating adjustable sealing mechanism according to claim 7, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

15. The floating adjustable sealing mechanism according to claim 8, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

16. The floating adjustable sealing mechanism according to claim 9, wherein an outer shell is rotatably sleeved on the support, the support is provided with a front limiting protrusion that defines a forward movement limit of the outer shell, the support is provided with a rear limiting protrusion on a rear side of the front limiting protrusion, and the outer shell is provided with a shell limiting portion that is disposed between the front and rear limiting protrusions and configured to collaborate with the rear limiting protrusion in a stopping manner to define a backward movement limit of the shell relative to the support.

* * * * *

UNITED STATES PATENT AND TRADEMARK OFFICE
CERTIFICATE OF CORRECTION

PATENT NO.       : 9,977,197 B1
APPLICATION NO.  : 15/575818
DATED            : May 22, 2018
INVENTOR(S)      : Weike Li et al.

Page 1 of 1

It is certified that error appears in the above-identified patent and that said Letters Patent is hereby corrected as shown below:

On the Title Page

The item (73) Assignee's Name "AVIC JONHSON OPTRONIC TECHNOLOGY CO., LTD" should be changed to -- AVIC JONHON OPTRONIC TECHNOLOGY CO., LTD --.

Signed and Sealed this
Twenty-eighth Day of August, 2018

Andrei Iancu
*Director of the United States Patent and Trademark Office*